July 14, 1953     I. KALIKOW     2,645,438
MOUNTING DEVICE FOR ENGINE ACCESSORIES
Filed April 19, 1949
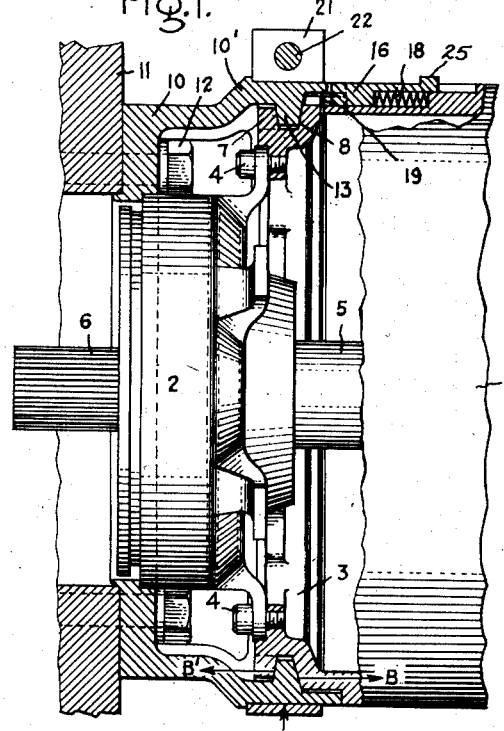
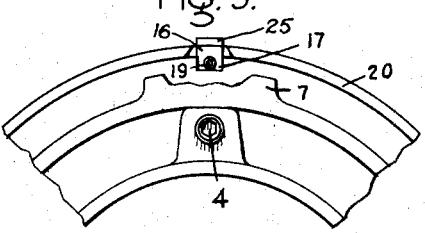
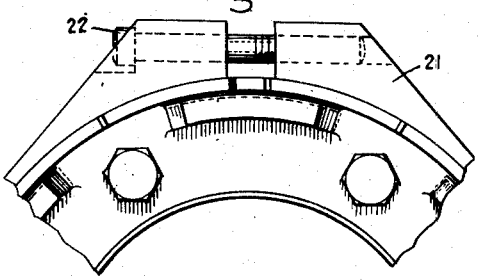
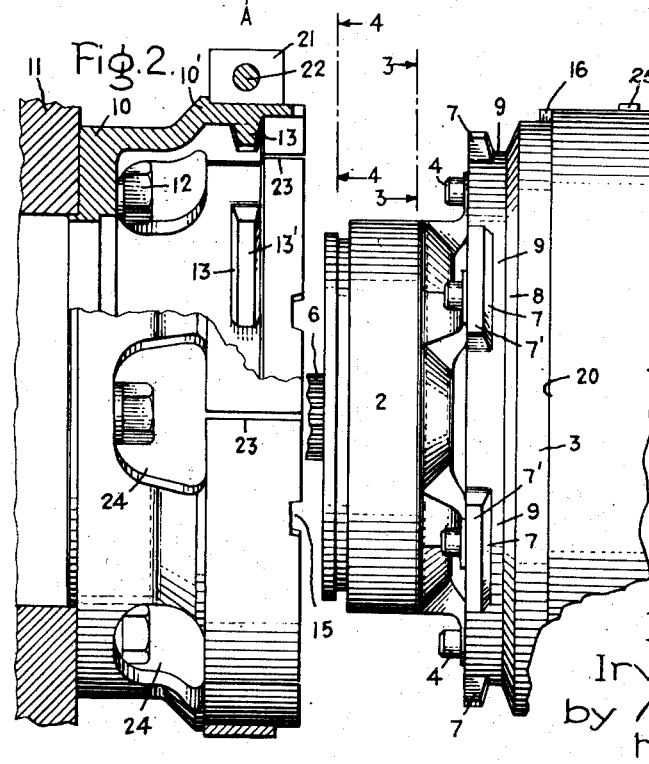
Inventor:
Irving Kalikow,
by *Powell & Mack*
His Attorney.

Patented July 14, 1953

2,645,438

UNITED STATES PATENT OFFICE 2,645,438

MOUNTING DEVICE FOR ENGINE ACCESSORIES

Irving Kalikow, Swampscott, Mass., assignor to General Electric Company, a corporation of New York Application April 19, 1949, Serial No. 88,447

3 Claims. (Cl. 248—2)

My invention relates to a mounting device for engine accessories and it has for its principal object the provision of means whereby a dynamoelectric machine or similar engine accessory may be quickly and easily secured to an accessory supporting member of an engine.

Dynamoelectric machines, such as starters or generators, are often employed as accessories to internal combustion engines and are usually attached to a mounting flange which is secured for that purpose to the engine casing. In many internal combustion engines, such as aircraft engines, the space provided for accessories around the engine is likely to be small and comparatively inaccessible with the result that difficulties in the installation, servicing and removal of such engine accessories are often encountered. In order to minimize these difficulties, the fastening means employed should preferably be simple to engage and assemble. In addition it should be possible to fasten the accessory to the engine at different rotational positions in order to position the accessory properly with reference to an associated terminal block and connecting leads as well as to provide greater convenience in installation.

Additional difficulties result from the excessive degree of vibration that normally accompanies the operation of internal combustion engines. Therefore, the fastening means which is employed must be sturdy enough to withstand this vibration; and means must also be provided whereby the engine accessory, once it is assembled to the mounting flange, can be securely locked in place so that this vibration will not shake it loose.

If a dynamoelectric machine is employed as an accessory to an aircraft engine, it is also highly desirable, both for safety and convenience, that the fastening means be constructed to permit a very rapid connection and disconnection of the machine to the engine.

Another object of my invention, therefore, is to provide simple but sturdy means whereby an engine accessory such as a dynamoelectric machine can be quickly and easily assembled and locked to an engine in many different rotational positions.

A more specific object of my invention is to provide a mounting device for an engine accessory which is constructed to withstand severe engine vibration and yet is not unduly heavy or cumbersome.

Broadly stated, the embodiment of my invention herein illustrated and described comprises a mounting flange, adapted to be secured to a supporting member, such as an engine casing, and having a plurality of circumferentially extending lugs projecting from the internal peripheral surface thereof and constructed to fit within grooves formed between an annular shoulder and a plurality of lugs projecting from one end of a dynamoelectric machine. To assemble, the end portion of the dynamoelectric machine is inserted within the mounting flange and is rotated until both sets of projecting lugs are mutually aligned. Rotation restraining means are provided whereby the rotational movement may be stopped when the proper alignment is achieved. Once aligned, the lugs of the mounting flange are constricted to wedge tightly within their accommodating grooves by a clamping means which is tightened around the circumference of the mounting flange. A plurality of apertures formed axially in the mounting flange intermediate the projecting lugs thereof permits the constriction of the flange.

The novel features which I believe to be characteristic of my invention are set forth with particularity in the appended claims. My invention itself, however, together with further objects and advantages thereof, may best be understood by reference to the following description taken in connection with the accompanying drawing in which Fig. 1 is a side elevational view, partly in section, illustrating, in an engaged position, a dynamoelectric machine and a mounting flange embodying my invention; Fig. 2 is a side elevational view, partly in section, illustrating the machine and mounting flange of Fig. 1 in a disengaged position; Fig. 3 is an end view of a portion of the dynamoelectric machine of Fig. 1 (and along line 3—3 of Fig. 2) showing the rotation restraining means preferably employed in my invention; and Fig. 4 is an end view of the mounting flange of Fig. 1 (and along line 4—4 of Fig. 2) showing the clamping means preferably employed therein.

Referring to Figs. 1 and 2, I have shown a dynamoelectric machine such as an aircraft generator 1 having an antifriction bearing member 2 which is secured to an end portion 3 of generator 1 by any suitable means, such as bolts 4. A generator drive shaft 5 having a splined external portion 6 is adapted to rotate freely within bearing 2. The splines of shaft 5 are constructed to engage splines on a power shaft (not shown) of an associated aircraft engine having an accessory supporting member 11.

The generator end portion 3, as best seen in Fig. 2, is provided with a plurality of circumferentially extending congruent lugs 7, preferably projecting outward as illustrated. These lugs 7 are equally spaced and form, together with an annular shoulder 8 of the generator end portion 3, a plurality of equally spaced raised portions defining arcuate grooves 9 whose configuration is determined by the shape of lugs 7 and annular shoulder 8. For reasons subsequently to be explained, the sides of lugs 7 and annular shoulder 8 are preferably tapered to cause the grooves 9 to have a wedge-shaped cross-sectional configuration.

A mounting flange 10 having a cylindrical open end portion 10' is secured to the accessory supporting member 11, which may be the rear casing of an aircraft engine, by any suitable fastening means, preferably detachable, such as by bolts 12. The end portion 10' of the mounting flange 10 has a diameter slightly larger than the diameter of the machine end portion 3 and is also provided with a plurality of lugs 13 projecting inward from the interior peripheral surface of the flange 10 at equally spaced circumferential positions corresponding to the circumferential positions of generator lugs 7. These inwardly projecting flange lugs 13 have a cross-sectional configuration that is constructed to conform contiguously to the sides of the circumferentially extending arcuate grooves 9 formed on the generator housing 3.

Although it is evident that many different conforming configurations of flange lugs 13 and grooves 9 may be employed, I have found that engine vibration is best withstood, for reasons subsequently to be explained, if wedge-shaped flange lugs are provided which exactly match wedge-shaped grooves as illustrated in the drawing. Such wedge-shaped lugs 13 and grooves 9 can be formed with ease and precision by conventional machining operations.

In order to enable the end portion of the generator 1 to be interfitted within the mounting flange 10, the displacement distance between the lugs 7 of the generator end portion 3 is, of course, greater than the width of the lugs 13 of the mounting flange 10; and conversely, the displacement distance between the mounting flange lugs 13 is also greater than the width of the generator lug 7. Furthermore, in order to facilitate the rotational insertion of the mounting flange lugs 13 within the arcuate grooves 9, the top surface 13' of the flange lugs 13 is concave to match the outer peripheral surface of the generator housing 3 while the top surface 7' of the generator lugs 7 is convex to match the inner peripheral surface of the flange 10.

Since all of the grooves 9 are identically shaped and equally spaced, any one of the congruent mounting flange lugs 13 may be inserted within any one of the grooves 9 with the result that all of the lugs 13 may be engaged within all of the grooves 9 from a number of different rotational positions determined by the number and position of the lug combinations. It is evident that the actual engagement is accomplished by inserting the generator 1 within the mounting flange 10 and rotating the generator 1 either clockwise or counterclockwise until the mounting flange lugs 13 are aligned to the generator lugs 7 and fitted completely within the arcuate grooves 9 as illustrated in Fig. 1.

Rotation restraining means are also preferably provided to prevent further rotation of the generator once the generator lugs 7 have been completely inserted within their accommodating grooves 9. It will be appreciated, of course, that simple manual locking means, such as a set screw threaded through the mounting flange 10 and making contact with the outer surface of the end portion 3 of the generator 1, may be employed to restrain further rotation of the generator upon alignment of the lugs 7 and 13. However, in order to simplify greatly the generator mounting process, I preferably provide, as illustrated in the drawing, a rotation restraining means which automatically prevents further rotation when the proper alignment is attained.

A plurality of indentations 15 (best seen in Fig. 2), equal in number to the number of flange lugs 7, are formed in the circumferential edge of the mounting flange 10 and are circumferentially separated from center-to-center by a distance equal to the circumferential center-to-center separation of the lugs 7. A locking member 16 best seen in Figs. 1 and 3, with a cross section which conforms to these indentations 15, is slidably fitted within a longitudinal groove 17 formed in the end portion of the generator housing 3. A resilient member such as a spring 18 is inserted behind this locking member 16 to exert an outward pressure thereon, and a stopping pin 19 is placed in front of the locking member 16 to prevent it from being propelled out of its groove 17. In the disengaged position of the generator illustrated in Fig. 2, the locking member 16 is held by the stopping pin 19 in a position projecting axially slightly beyond a rim 20 of the generator end portion 3.

When the generator 1 is interfitted within the mounting flange 10, the rim 20 approaches the outer edge of the flange 10 and the locking member 16 is thereby forced backward within groove 17 against the pressure of spring 18. As the generator 1 is rotated, a position is reached wherein the locking member 16 is aligned to one of the indentations 15 and is forced thereinto by the pressure of spring 18. The position of the locking member 16 relative to the position of the indentations 15 is constructed to be such that this locking action takes place whenever the flange lugs 13 are fully engaged within grooves 9.

In order to prevent the generator from becoming disengaged under the stress of violent vibration, such as commonly occurs in aircraft engines, I provide clamping means to fasten the generator 1 securely within the mounting flange 10. A split clamping ring 21 encircles the outer circumference of the mounting flange 10. Split ring 21 is provided with means for drawing together the ends thereof such as a threaded screw 22 (best seen in Fig. 4). A plurality of elongated apertures 23 are formed in the flange end portion 10' intermediate the flange lugs 13. Each of these apertures extends axially from the outer edge of the flange 10 to a corresponding hole 24 formed in the body of the flange. Together, the apertures 23 serve to split the outer end portion 10' of the flange 10 into a plurality of separate arcuate, relatively flexible segments. By drawing together the ends of the clamping ring 21, these segments are constricted under high pressure and the flange lugs 13 are firmly wedged within their accommodating arcuate grooves 9. It will be appreciated that the clamping ring 21 may be rotated around the mounting flange to provide access to the tightening bolt 22 from any angular position.

Referring again to Fig. 1, I have vectorially represented the forces resulting when flange lugs 13 having the preferred wedge-like configuration are wedged into conforming grooves 9 by tightening the clamping ring 21. The inward clamping force A is converted by the wedge action into two equal and opposite axial forces B and B'. These axial forces are very much larger than the constrictive force A and are determined by the wedge angle. Since similar wedge action simultaneously occurs at equally spaced points around the circumference of the generator end portion due to the plurality of flange lugs 13 and accommodating grooves 9, the resultant axial forces of the entire clamping system are balanced, and stresses from any direction hardly disturb the equilibrium. If the engine casing 11 is vibrating, the resultant generator vibration stresses also appear as axial forces at the mounting flange; but since these vibration stresses, even under the most severe vibration conditions, are much smaller than the balanced axial forces caused by the wedge action of the flange lugs, they have relatively little effect on the clamping system.

To perform the entire mounting process, it is only necessary to interfit the generator 1 within the mounting flange 10 from any one of many different rotational positions, to rotate the generator in either direction until locking member 16 snaps into one of the indentations 15 and to tighten bolt 22 of the clamping ring 21.

In order to disconnect the generator 1 from the flange 10, the bolt 22 of the clamping ring 21 is loosened, the locking member 16 is disengaged from the indentation 15 in which it is seated by pushing back on a lip 25 of the locking member 16, and the generator is rotated and removed. An alternative method of disconnecting the generator is to loosen bolt 22 of the clamping ring 21, to slide the clamping ring 21 over the generator end portion 3 until it pushes against the lip 25 of the locking member 16 thereby disengaging the locking member 16 from its associated indentation 15, and to rotate and remove the generator.

A device is thus provided which fulfills the objects of my invention as previously set forth. An engine accessory such as a dynamoelectric machine may be inserted from many different rotational positions and may also be secured to the engine in different rotational positions thereby minimizing the mounting difficulties inherent in the small working space available around the conventional aircraft engine. The entire assembly is sufficiently sturdy to withstand severe engine vibration, and the combination of locking and clamping means employed assures that the engine accessory will remain securely fastened to the engine. As fully described above, rapid connection and disconnection of the accessory to the flange may be accomplished. Additional minor advantages, such as the accessibility to the tightening bolt of the clamping ring from any position, are also apparent from the foregoing description.

It will be appreciated that although I have described my invention as applied to engine accessories, it is equally applicable to any device, having a properly constructed end portion, which is desired to be rapidly fastened to a supporting member in a manner to withstand severe vibration.

While I have shown a particular embodiment of my invention, it is to be understood that I do not wish to be limited thereto since many modifications can be made; and I intend, therefore, by the appended claims to cover all such modifications as fall within the true spirit and scope of my invention.

What I claim as new and desire to secure by Letters Patent of the United States is:

1. A quick disconnect system for mounting an accessory on an engine support pad comprising a pair of members having telescoping cylindrical end portions, each of said end portions terminating in a plurality of equally spaced wedge-shaped arcuate lugs, said lugs on the inner of said end portions projecting radially outwardly and said lugs on the outer of said end portions projecting radially inwardly and being circumferentially spaced to pass between said lugs on said inner end portion upon relatively axial movement therebetween, the outer of said end portions comprising a plurality of arcuate segments defining narrow intervening slots therebetween extending from the end of said outer end portion to a point more remote therefrom than the lugs thereof, an annular shoulder on one of said end portions axially spaced from the lugs thereon and defining therewith a plurality of wedge-shaped arcuate grooves equal in number to the number of lugs on the other of said end portions, said end portions being in an interlocked relationship with said lugs of said other of said end portions positioned in said grooves and being relatively rotatable to a non-interlocked relationship, rotation restraining means to secure said end portions in an interlocked relationship, and clamping means encircling said segments in radial alignment with said lugs and tensionable to constrict said segments upon said inner end portion to effect a wedging force holding the contacting surfaces of the cooperating lugs and grooves together with substantially greater force than the severe vibrational forces encountered in use tending to separate said contacting surfaces.

2. A quick disconnect system for mounting an accessory on an engine support pad comprising a pair of members having telescoping cylindrical end portions, the outer of said members having a rigid flange on one end thereof, a plurality of relatively rigid circumferentially spaced ribs projecting substantially axially from said flange and defining open spaces therebetween, said ribs respectively terminating in arcuate segments defining narrow intervening slots therebetween extending from the end of said segments to said open spaces, said segments forming the first of said cylindrical end portions, equally spaced wedge-shaped arcuate lugs projecting radially inwardly from the inner periphery of said segments, the inner of said members forming the second of said cylindrical end portions, said second cylindrical end portion terminating in a plurality of equally spaced wedge-shaped arcuate lugs projecting radially outwardly and being circumferentially spaced to pass between said inwardly projecting lugs of said outer member upon relative axial movement, one of said cylindrical end portions having an annular shoulder axially spaced from the lugs thereof and defining therewith a plurality of equally spaced arcuate grooves equal in number to the number of lugs on the other of said cylindrical end portions, said cylindrical end portions being in an interlocked relationship with said lugs of said other of said cylindrical end portions positioned in said grooves and being relatively rotatable to a non-interlocked relationship, rotation restraining means to secure said end portions in an interlocked relationship, and clamping means encircling said segments and radially aligned with the lugs thereof tensionable to constrict said segments upon said inner end portion to effect a wedging force holding the contacting surfaces of the cooperating lugs and grooves together with substantially greater force than the severe vibrational forces encountered in use which tend to separate said contacting surfaces.

3. A quick disconnect system for mounting an accessory on an aircraft engine support pad comprising a first member having a rigid substantially radial flange portion formed on one end thereof adapted to engage a cooperating mounting surface on an engine, said flange portion having a plurality of equally spaced axially extending holes formed therein for the reception of mounting studs to secure said first member to an engine support pad, an identical number of relatively rigid ribs respectively positioned equidistant between adjacent pairs of said holes and defining open spaces therebetween, said ribs projecting substantially axially outwardly from said radial flange portion and respectively terminating in arcuate segments defining narrow intervening slots therebetween extending from the end of said segments to said open spaces, said segments forming a cylindrical end portion, equally spaced wedge-shaped arcuate lugs projecting radially inwardly from the inner periphery of said segments, a second member adapted to be connected to an accessory and having a cylindrical end portion terminating in a plurality of equally spaced wedge-shaped arcuate lugs projecting radially outwardly, an annular shoulder on the outer periphery of said cylindrical end portion of said second member axially spaced from the lugs thereof and defining therewith a plurality of wedge-shaped arcuate grooves equal in number to the number of lugs on said first member, said lugs on said cylindrical end portion of said second member being dimensioned to pass between the inwardly projecting lugs of said first member to a position abutting said shoulder upon relative axial movement, said members being in an interlocked relationship with the lugs of said first member positioned in the grooves of said second member and being relatively rotatable to a non-interlocked relationship, a plurality of peripheral notches formed in the peripheral edge of said first member end portion, rotation restraining means on said second member comprising a spring biased locking member axially slidable into any one of said notches to secure said lugs in an interlocked relationship, and clamping means for constricting said segments comprising a split ring encircling said segments in radial alignment with said lugs and having spaced screw receiving means at the ends thereof, and screw means engaging said screw receiving means to produce tension in said ring for constricting said segments to effect a wedging force between said lugs of said first member and said grooves of said second member sufficient to prevent any momentary separation of their respective contacting surfaces during severe vibrational use.

IRVING KALIKOW.

References Cited in the file of this patent

UNITED STATES PATENTS

| Number | Name | Date |
|---|---|---|
| 266,359 | Gotzel | Oct. 24, 1882 |
| 612,685 | Thorp et al. | Oct. 18, 1898 |
| 1,020,615 | Magnuson | Mar. 19, 1912 |
| 2,041,762 | Hazard et al. | May 26, 1936 |
| 2,212,571 | Martin | Aug. 27, 1940 |
| 2,368,537 | Gilbert | Jan. 30, 1945 |
| 2,471,182 | Worth | May 24, 1949 |
| 2,544,151 | Gilbert et al. | Mar. 6, 1951 |